United States Patent
Takahara

(10) Patent No.: US 6,808,203 B2
(45) Date of Patent: Oct. 26, 2004

(54) AIR BAG SYSTEM

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 10/288,335

(22) Filed: Nov. 6, 2002

(65) Prior Publication Data

US 2003/0090095 A1 May 15, 2003

(30) Foreign Application Priority Data

Nov. 12, 2001 (JP) ........................................ 2001-345639

(51) Int. Cl.$^7$ ............................................. B60R 21/28
(52) U.S. Cl. ..................................... 280/740; 280/742
(58) Field of Search .......................... 280/728.1, 730.2, 280/736, 739, 740, 742, 743.1

(56) References Cited

U.S. PATENT DOCUMENTS

| | | | | |
|---|---|---|---|---|
| 5,316,336 A | * | 5/1994 | Taguchi et al. | 280/730.2 |
| 6,109,649 A | * | 8/2000 | Adomeit et al. | 280/740 |
| 6,293,581 B1 | * | 9/2001 | Saita et al. | 280/730.2 |
| 6,375,214 B1 | * | 4/2002 | Nishikaji | 280/728.2 |
| 6,412,810 B1 | * | 7/2002 | Wipasuramonton et al. | 280/730.2 |
| 6,450,527 B2 | * | 9/2002 | Kobayashi et al. | 280/729 |
| 6,485,048 B2 | * | 11/2002 | Tajima et al. | 280/728.2 |
| 6,543,804 B2 | * | 4/2003 | Fischer | 280/730.2 |
| 6,575,496 B2 | * | 6/2003 | Hess et al. | 280/730.2 |
| 6,655,713 B2 | * | 12/2003 | Tanase et al. | 280/743.1 |
| 2002/0036396 A1 | * | 3/2002 | Fischer | 280/730.2 |

FOREIGN PATENT DOCUMENTS

| | | |
|---|---|---|
| DE | 200 11 082 U1 | 11/2000 |
| JP | 10-509402 | 9/1998 |
| JP | A 11-301394 | 11/1999 |
| JP | A 11-321536 | 11/1999 |
| JP | A 2000-127886 | 5/2000 |
| WO | WO 97/34785 | 9/1997 |

\* cited by examiner

Primary Examiner—Paul N. Dickson
Assistant Examiner—Toan C To
(74) Attorney, Agent, or Firm—Oliff & Berridge, PLC

(57) ABSTRACT

An air bag system is provided which includes an inflator serving as a gas generator, an air bag which is stored in a folded state in a certain portion of a vehicle and is adapted to be inflated by the gas supplied from the inflator to protect a vehicle occupant or occupants, and a diffuser serving to guide gas from the inflator into the air bag. In the air bag system, a preliminary inflatable portion is formed in a gas supply port of the air bag and a gas distribution portion formed in the end of the diffuser is arranged within the preliminary inflatable portion.

11 Claims, 2 Drawing Sheets

AIR BAG SYSTEM

INCORPORATION BY REFERENCE

The disclosure of Japanese Patent Application No. 2001-345639 filed on Nov. 12, 2001, including the specification, drawings and abstract is incorporated herein by reference in its entirety.

BACKGROUND OF THE INVENTION

1. Field of Invention

The invention generally relates to an air bag system installed in a vehicle, and more particularly to an air bag system which protects a vehicle occupant or occupants by inflating an air bag, which is stored in a folded state in a certain portion of the vehicle, using the gas supplied from an inflator.

2. Description of Related Art

In a known air bag system of the above type, for example, an air bag is stored along a roof side rail and is inflated by the gas supplied from an inflator into the shape of a curtain along a side wall of a passenger compartment of the vehicle, in order to protect a vehicle occupant or occupants from head injury. In another example of such an air bag system, an air bag stored in an instrument panel is inflated by the gas supplied from an inflator toward the inside of a passenger compartment of the vehicle, in order to protect a vehicle occupant or occupants from head and chest injuries.

In an air bag system disclosed in, for example, Japanese Laid-Open Patent Publication No. 11-321536, an inner tube is disposed along a gas passage (a gas inlet portion) of an air bag in order to reduce the degree of so-called "bag damage", a damage caused to the air bag by the gas supplied from an inflator. In the air bag systems disclosed in Japanese Laid-Open Patent Publications No. 11-301394 and No. 2000-127886, a tubular member (a protection member) is disposed along a gas passage of an air bag in order to reduce the degree of bag damage due to the gas supplied from an inflator.

According to the above air bag systems, however, the inner tube or the tubular member (protection member), disposed along the gas passage of the air bag for reducing the degree of bag damage, obstructs the air bag to be folded, thus reducing the ease of storing the air bag in the vehicle and causing an increase in the cost of the air bag.

In general, air bag systems are constructed so as to satisfy several requirements related to the deployment performance of the air bag, such as a requirement for making the time from the beginning of the deployment of the air bag until its completion equal to or shorter than a predetermined time, a requirement for maintaining the initial internal pressure of the air bag equal to or higher than a predetermined high pressure from the beginning of the deployment of the air bag until its completion, and a requirement for maintaining the internal pressure of the air bag equal to or higher than a predetermined low pressure for a predetermined time from the elapse of a predetermined initial time since the completion of the deployment of the air bag.

When it is necessary to reduce the time required for completing the deployment of the air bag or increase the initial pressure of the air bag for satisfying the requirements as described above, the gas supply power of the inflator is generally increased. When the gas supply power of the inflator is increased, however, it increases the degree of bag damage, thus making it difficult or impossible to maintain the internal pressure of the air bag for a long time. In such a case, therefore, it is necessary to reduce the degree of bag damage by applying a sufficient amount of a coating material for guaranteeing airtightness to the air bag in order to increase its airtightness or by forming the air bag from the material having an increased airtightness, before increasing the gas supply power of the inflator. In this way, an improvement of the deployment performance of the air bag and a reduction of the cost of the air bag can not be achieved at the same time. This problem, however, is sure to be solved if it is possible to reduce the degree of bag damage at low cost.

SUMMARY OF THE INVENTION

In view of the above problem, the invention provides an air bag system which protects a vehicle occupant or occupants by inflating an air bag, stored in a folded state in a certain portion of a vehicle, using a gas supplied from an inflator, in which air bag system a preliminary inflatable portion is formed in a gas supply port of the air bag and a gas distribution portion of a diffuser serving to guide gas from the inflator into the air bag is arranged within the preliminary inflatable portion.

In the air bag system constructed as described above, gas is supplied to the preliminary inflatable portion formed in the gas supply port of the air bag from the inflator through the gas distribution portion of the diffuser, and the gas is then supplied to other portions (other inflatable portions) of the air bag from the preliminary inflatable portion while being dispersed in three-dimensional directions. Thus, the gas is temporarily stored in the preliminary inflatable portion in the early stage of the deployment of the air bag 11. At this time, therefore, the gas pressure in the preliminary inflatable portion becomes temporarily high while the gas pressures in the other portions (the portions of the air bag to which the dispersed gas is supplied) of the air bag 11 do not.

According to the above-described air bag system, therefore, it is possible to reduce the degree of "bag damage", a damage caused to the air bag by the gas supplied from the inflator, and enhance the airtightness of the air bag at low cost by only increasing the thickness of a coat for guaranteeing airtightness to be formed on the surface of the preliminary inflatable portion. Also, gas is dispersed in three-dimensional directions when it is supplied from the preliminary inflatable portion to the other portions of the air bag, therefore the gas supply can be efficiently performed to reduce the time required for completing the deployment of the air bag. As a result, an improvement of the deployment performance of the air bag and a reduction of the cost of the air bag can be achieved at the same time.

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF PREFERRED EMBODIMENTS

Figure 1:
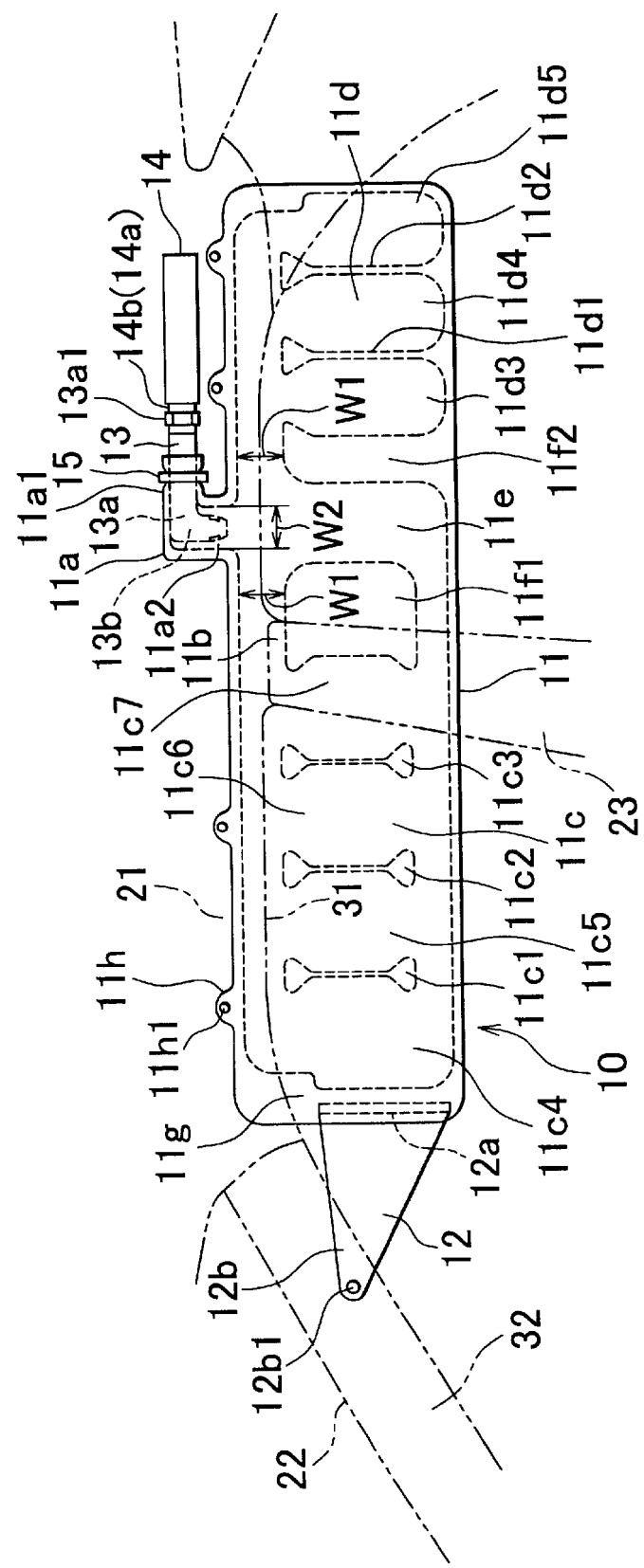
FIG. 1 is a side view showing a head-protection air bag system according to one exemplary embodiment of the invention.
Figure 2:
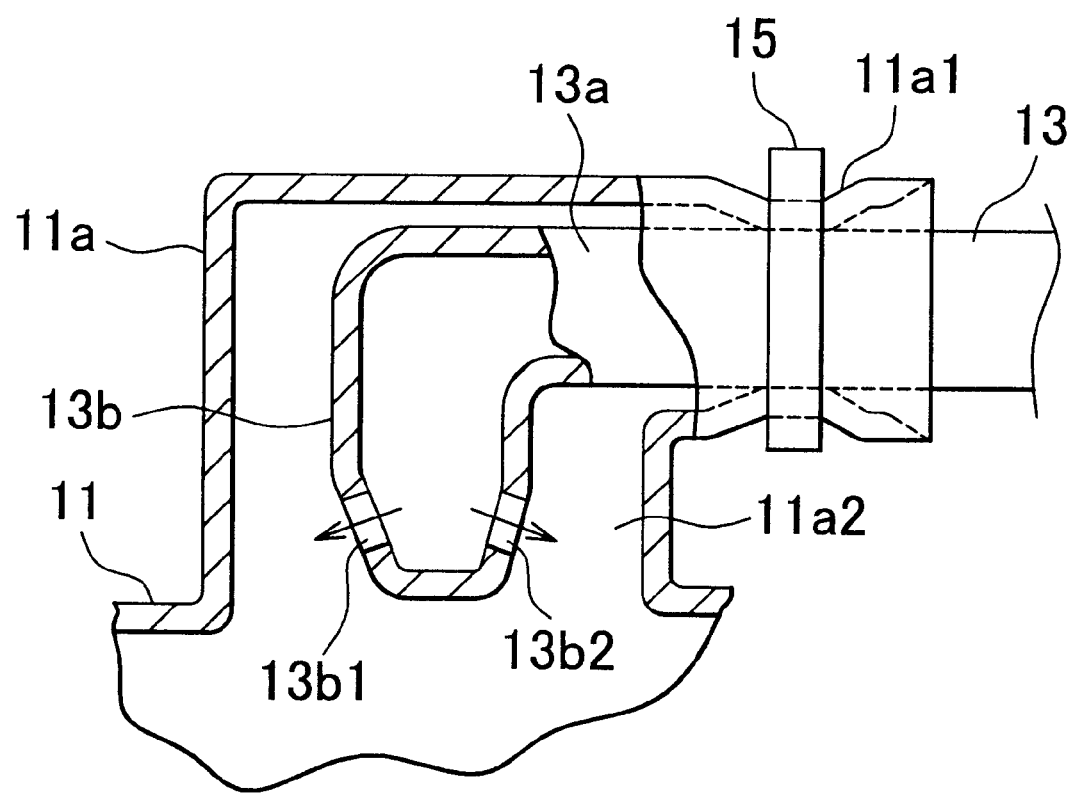
FIG. 2 is a partially cross-sectional, enlarged side view showing one portion of the head-protection air bag system shown in FIG. 1.

In the following description and the accompanying drawings, the invention will be described in more detail with reference to exemplary embodiment. FIGS. 1 and 2 show a head-protection air bag system designed for passenger vehicles according to one embodiment of the invention. The head-protection air bag system of the embodiment includes an air bag module 10 constituted of an air bag 11, a tension cloth 12, and an inflator 14. The air bag 11 is adapted to be inflated into the shape of a curtain along a side wall of the passenger compartment of the vehicle. The tension cloth 12 is attached to the front-end portion of the air bag 11. The inflator 14 is airtightly connected together with a diffuser 13 to a gas supply port 11a of the air bag 11.

The air bag 11 is woven into the shape of a bag in such a manner that the weave patterns extend in both longitudinal and vertical directions of the vehicle. A coating material for guaranteeing airtightness is applied to the surface of the air bag 11. The air bag 11 has the gas supply port 11a, a gas passage 11b, a front-seat inflatable portion 11c, a rear-seat inflatable portion 11d, and an auxiliary inflatable portion 11e. The gas passage 11b extends in the longitudinal direction of the vehicle below the gas supply port 11a. The inflatable portions 11c, 11d, and 11e, are all supplied with gas through the gas passage 11b. The air bag 11 further has intermediate non-inflatable portions 11f1, 11f2, a front-end non-inflatable portion 11g, and a plurality of mounting lobes 11h.

When the airbag body 11 constructed as described above is stored in the vehicle, the gas passage 11b, the front-seat inflatable portion 11c, the rear-seat inflatable portion 11d, the auxiliary inflatable portion 11e, the intermediate non-inflatable portions 11f1, 11f2, the front-end non-inflatable portion 11g, and the like, of the air bag 11 are folded multiple times in the vertical direction of the vehicle into the shape of bellows, while the gas supply port 11a and the plurality of mounting lobes 11h are stored unfolded in the vehicle. Meanwhile, the gas passage 11b, the front-seat inflatable portion 11c, the rear-seat inflatable portion 11d, and the auxiliary inflatable portion 11e serve as the inflatable portions of the air bag 11, which are inflated by the supplied gas.

The gas supply port 11a serves to distribute the gas, which has been supplied from the inflator 14 through the diffuser 13, to the front-seat inflatable portion 11c, the rear-seat inflatable portion 11d, and the auxiliary inflatable portion 11e through the gas passage 11b. The gas supply port 11a includes an attaching portion 11a1, to be airtightly attached onto a periphery of a connecting portion 13a of the diffuser 13, and a preliminary inflatable portion 11a2 in which a gas distribution portion 13b of the diffuser 13 is arranged. Upon the deployment of the air bag 11, the preliminary inflatable portion 11a2 is inflated into a substantially cylindrical shape. At this time, the inflation of the preliminary inflatable portion 11a2 begins prior to supplying gas into the gas passage 11b.

The gas passage 11b extends substantially straight from the front end of the upper portion of the air bag 11 to the rear end thereof. Width W1 of the gas passage 11b (i.e., the length of the gas passage 11b in a direction substantially perpendicular to the direction of gas flow) is substantially equal to width W2 of the preliminary inflatable portion 11a2 of the gas supply port 11a (i.e., the length of the preliminary inflatable portion 11a2 in a direction substantially perpendicular to the direction of gas flow).

The front-seat inflatable portion 11c serves to protect an occupant seated on a front seat (a seat arranged with respect to a B pillar 23) from head injury, and includes three partitioning portions (non-inflatable portions) 11c1, 11c2, and 11c3, each having the shape of the letter "T." The partitioning portions 11c1, 11c2, and 11c3 are all arranged substantially in a vertical center of the air bag 11, thus partitioning a vertically center portion of the air bag 11 into four inflatable chambers (cells), 11c4, 11c5, 11c6, and 11c7. These inflatable chambers 11c4–11c7 communicate with one another in both upper and lower sides.

The rear-seat inflatable portion 11d serves to protect an occupant seated on a rear seat from head injury, and includes two partitioning portions (non-inflatable portions) 11d1 and 11d2 each having the shape of the letter "T." The partitioning portions 11d1 and 11d2 are both arranged substantially in the vertical center of the air bag 11, thus partitioning another vertical center portion of the air bag 11 into three inflatable chambers (cells), 11d3, 11d4, and 11d5. These inflatable chambers 11d3–11d5 communicate with one another in the upper sides.

The auxiliary inflatable portion 11e is adapted to be inflated earlier than the front-seat inflatable portion 11c and the rear-seat inflatable portion 11d upon the deployment of the air bag 11, so as to achieve improved deployment performance of the air bag 11 as described later. The auxiliary inflatable portion 11e extends from the lower end of an intermediate portion of the gas passage 11b in a downward direction. The capacity of the auxiliary inflatable portion 11e is set smaller than any one of the inflatable chambers (cells) 11c4 to 11c7 of the front-seat inflatable portion 11c and the inflatable chambers (cells) 11d3 to 11d5 of the rear-seat inflatable portion 11d. The inflatable chamber of the auxiliary inflatable portion 11e communicates with the gas passage 11b in its upper end and with the respective inflatable chambers (cells) 11c4 to 11c7 of the front-seat inflatable portion 11c in its lower end, and is adapted to be inflated into a substantially cylindrical shape upon the deployment of the air bag 11.

The front intermediate non-inflatable portion 11f1 is formed between the front-seat inflatable portion 11c and the auxiliary inflatable portion 11e while the rear intermediate non-inflatable portion 11f2 is formed between the auxiliary inflatable portion 11e and the rear-seat inflatable portion 11d. In the meantime, in the case where the auxiliary inflatable portion 11e is not formed in the air bag 11, a single non-inflatable portion is formed between the front-seat inflatable portion 11c and the rear-seat inflatable portion 11d.

The tension cloth 12 has a triangular shape (which can be changed to another shape if necessary) and is made from a non-coated woven cloth, which is thinner and less expensive than a cloth constituting the air bag 11. The tension cloth 12 is sewn at its rear-end portion 12a to the front-end non-inflatable portion 11g of the air bag 11. A front-end portion 12b of the tension cloth 12 having a mounting hole 12b1 is attached to an A-pillar 22 via the mounting hole 12b1.

The diffuser 13 includes the connecting portion 13a and the gas distribution portion 13b. The connecting portion 13a has a substantially straight shape and is connected to the inflator 14. The gas distribution portion 13b extends in a downwardly curved shape from the front end of the connecting portion 13a and is arranged within the gas supply port 11a of the air bag 11 together with the front end portion of the connecting portion 13a. Thus, the diffuser 13 substantially has the shape of a L-shaped cylinder closed at the end of the gas distribution portion 13b. The diffuser 13 is airtightly connected at one end to the inflator 14 in a substantially coaxial relationship by engaging a female screw portion or internally threaded portion (or nut portion) 13a1 formed at a proximal end (or a rear end) of the connecting portion 13a with a male screw portion or externally threaded portion 14b formed at a gas discharge hole 14a of the inflator 14. The diffuser 13 is also airtightly connected at the other end to the gas supply port 11a of the air bag 11 by fixing the attaching portion 11a1 of the gas supply port 11a of the air bag 11 onto the periphery of an intermediate portion of the connecting portion 13a using a fastening band 15.

The gas distribution portion 13b of the diffuser 13 includes two gas feed holes 13b1, 13b2 that are aligned with one another in the longitudinal direction of the vehicle and serve to disperse the gas in forward and rearward directions respectively. The gas feed holes 13b1, 13b2 have an equal diameter and are disposed substantially in a center of the width of the preliminary inflatable portion 11a2 (i.e., the length of the preliminary inflatable portion 11a2 in the longitudinal direction of the vehicle). The gas feed holes 13b1, 13b2 are formed in a tapered portion (or a truncated portion) formed at the end of the gas distribution portion 13b.

The inflator 14 ejects or supplies gas into the air bag 11 in the case of a side collision, rollover, or the like, of the vehicle. The inflator 14 is fixed to the roof side rail 21 by means of a bracket and a bolt (not shown). The inflator 14 is disposed in the longitudinally middle portion of the vehicle to extend in the longitudinal or running direction of the vehicle along the roof side rail 21 above the air bag 11 while being covered by the roof head lining 31.

In the air bag system of the embodiment constructed as described above, the air bag 11 and the tension cloth 12, which are folded multiple times in the vertical direction, are normally stored along the A-pillar 22 and the roof side rail 21 while being covered with the A-pillar garnish 32 and the roof head lining 31 respectively.

Also, in the embodiment, when a sensor (not shown) detects an acceleration equal to or higher than a set value in the case of an emergency, such as a side collision or rollover of the vehicle, the inflator 14 supplies gas through the diffuser 13 into the gas supply port 11a of the air bag 11 stored in a folded state. The supplied gas then inflates the auxiliary inflatable portion 11e, the front-seat inflatable portion 11c, and the rear-seat inflatable portion 11d of the air bag 11, thus deploying the air bag 11 as shown in FIG. 1. The entire body of the air bag 11 is eventually inflated into the shape of a curtain in the side region of the passenger compartment, thus protecting the front-seat and rear-seat occupants from head injury.

In the embodiment, gas is supplied to the preliminary inflatable portion 11a2 formed in the gas supply port 11a of the air bag 11 from the inflator 14 through the gas distribution portion 13b of the diffuser 13, and the gas is then supplied from the preliminary inflatable portion 11a2 to the other portions (other inflatable portions) of the air bag 11 while being dispersed in three-dimensional directions. Thus, the gas is temporarily stored in the preliminary inflatable portion 11a2 in the early stage of the deployment of the air bag 11. At this time, therefore, the gas pressure in the preliminary inflatable portion 11a2 becomes temporarily high while the gas pressures in the other portions (the portions of the air bag 11 to which the dispersed gas is supplied) of the air bag 11 do not become high.

Accordingly, it is possible to reduce the degree of bag damage and enhance the airtightness of the air bag 11 at low cost by only increasing the thickness of a coat for guaranteeing airtightness to be formed on the surface of the preliminary inflatable portion 11a2. Also, in the embodiment, gas is dispersed in three-dimensional directions when it is supplied from the preliminary inflatable portion 11a2 to the other portions of the air bag 11, therefore the gas supply can be efficiently performed to reduce the time required for completing the deployment of the air bag 11. As a result, an improvement of the deployment performance of the air bag 11 and a reduction of the cost of the air bag 11 can be achieved at the same time.

Also, in the embodiment in which the preliminary inflatable portion 11a2 is formed in the longitudinally middle portion of the air bag 11 and gas is supplied from the preliminary inflatable portion 11a2 towards both longitudinal ends of the air bag 11, the inflatable portions of the air bag 11 can be evenly inflated in an efficient manner, thus assuring an improved deployment manner or performance of the air bag 11.

Also, in the embodiment in which the preliminary inflatable portion 11a2 of the air bag 11 is stored in an unfolded state in the vehicle, the preliminary inflatable portion 11a2 hardly damps the flow of the supplied gas (i.e., only a small amount of energy is consumed for inflating the preliminary inflatable portion 11a2), therefore the time required for completing the deployment of the air bag 11 can be reduced. Also, since the preliminary inflatable portion 11a2 is inflated into a substantially cylindrical shape upon the deployment of the air bag 11 in the embodiment, the gas distribution portion 13b (which is formed in a cylindrical shape) of the diffuser 13 can be easily disposed concentrically with the preliminary inflatable portion 11a2, and the space efficiency of the air bag system can be improved.

Also, in the embodiment, width W2 of the preliminary inflatable portion 11a2 is substantially equal to width W1 of the gas passage 11b serving to guide gas from the preliminary inflatable portion 11a2 to the respective inflatable portions of the air bag 11. This arrangement enables efficient and smooth supply of gas from the preliminary inflatable portion 11a2 to the gas passage 11b, which also enables to reduce the time required for completing the deployment of the air bag 11.

Also, in the embodiment, the gas distribution portion 13b of the diffuser 13 is disposed substantially in a center of the width of the preliminary inflatable portion 11a2 of the air bag 11. With this arrangement, the preliminary inflatable portion 11a2 of the air bag 11 can be uniformly inflated in the longitudinal direction of the vehicle and gas can thus be evenly supplied to the other portions (inflatable portions) of the air bag 11 from the preliminary inflatable portion 11a2.

Also, in the embodiment in which the gas distribution portion 13b of the diffuser 13 includes the gas feed holes 13b1, 13b2 arranged so as to disperse gas in forward and rearward directions, gas can be quickly supplied into the preliminary inflatable portion 11a2 of the air bag 11 from the diffuser 13 in a uniform manner.

Also, in the embodiment, the diffuser 13 is formed substantially in the shape of the letter "L" including the connecting portion 13a, which has a substantially straight shape and is connected to the inflator 14, and the gas distribution portion 13b, which extends in a curved shape from the end of the connecting portion 13a and is arranged in the gas supply port 11a of the air bag 11. With this arrangement, when the gas supply port 11a of the air bag 11 is formed substantially perpendicular to the longitudinal direction of the air bag 11, the connecting portion 13a of the diffuser 13 and the inflator 14 can be arranged in a compact size along the longitudinal direction of the air bag 11, thus making it easier to install the air bag 11 in the vehicle.

Also, in the embodiment in which the gas supply port 11a of the air bag 11 includes the attaching portion 11a1 that is airtightly attached onto the periphery of the connecting portion 13a of the diffuser 13, the preliminary inflatable portion 11a2 can be formed to have a large space around the gas distribution portion 13b of the diffuser 13. This arrangement enables gas to be extensively dispersed in three-dimensional directions when it is supplied to the other portions (inflatable portions) of the air bag 11 from the gas supply port 11a. In this way, an improvement of the deployment performance of the air bag 11 and a reduction of the degree of bag damage can be achieved at the same time.

In the above-described embodiment, the width of a portion of the gas passage 11b that extends forwardly of the gas supply port 11a of the air bag 11 and the width of another portion thereof that extends rearwardly of the gas supply port 11a of the air bag 11 are both set to width W1, namely are equal to each other. However, in light of the fact that the capacity of the front-seat inflatable portion 11c is larger than that of the rear-seat inflatable portion 11d, the width of the portion of the gas passage 11b extending forward may be made larger than that of the portion extending reward. Thus, the amount of gas to be supplied to the front-seat inflatable portion 11c can be made larger than the amount of gas to be supplied to the rear-seat inflatable portion 11d, so as to finish inflating the front-seat inflatable portion 11c and the rear seat inflatable portion 11d substantially at the same time.

Also, while the two gas feed holes 13b1, 13b2 are formed in the gas distribution portion 13b of the diffuser 13 so as to be aligned with each other in the longitudinal direction of the vehicle in the above-described embodiment, the number of the gas feed holes to be formed in the gas distribution portion 13b of the diffuser 13, the diameter, shape, arrangement of each gas feed hole, and the like, are not limited to those in the above-described embodiment, but may be changed, if necessary, depending upon the shape of the preliminary inflatable portion, the front-seat inflatable portion, and the rear-seat inflatable portion formed in the air bag, and the like.

While the invention has been embodied as the air bag system including the air bag 11 in which the auxiliary inflatable portion 11e communicates at its lower end with the front-seat inflatable portion 11c, the invention may also be embodied, equally or by making necessary modifications, as an air bag system including an air bag in which an auxiliary inflatable portion communicates at its lower end with a rear-seat inflatable portion or does not communicate at its lower end with either of the front-seat inflatable portion or the rear-seat inflatable portion, or in which the auxiliary inflatable portion is not formed.

While the air bag 11 is woven into the shape of a bag in the above-described embodiment, the air bag 11 may be sewn into the shape of a bag, or may be formed into the shape of a bag by bonding (or thermal bonding). Furthermore, while the invention has been embodied as the air bag system in which the gas supply port 11a is formed in the upper middle portion of the air bag 11, the invention may be embodied, equally or by making necessary modifications, as an air bag system in which a gas supply port is formed in a rear end portion or a front end portion of an air bag.

While the invention has been embodied as the head-protection air bag systems for use in passenger vehicles, the invention may be embodied, equally or by making necessary modifications, as a head-protection air bag systems for other types of vehicles than passenger vehicles. The invention may also be embodied, equally or by making necessary modifications, as an air bag system of various types, in which an air bag, which is stored in a folded state in a certain portion of the vehicle, is inflated by the gas supplied from an inflator so as to protect the occupant(s) upon the deployment of the air bag, such as an air bag system for a passenger seat and a knee air bag system to be installed in an instrument panel, and an air bag system to be mounted in a certain portion of a seat like a side air bag system.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An air bag system, comprising:
an inflator serving as a gas generator;
an air bag which is stored along an A-pillar and a roof side rail in a folded state in a portion of a vehicle and is adapted to be inflated into a curtain along a side wall of a passenger compartment of the vehicle by gas supplied from the inflator to protect at least one vehicle occupant; and
a diffuser serving to guide the gas from the inflator into the air bag, wherein
a preliminary inflatable portion is formed in a gas supply port of the air bag, the preliminary inflatable portion being disposed in a longitudinally middle portion of the air bag and a gas distribution portion is formed in an end of the diffuser and is arranged within the preliminary inflatable portion, the gas distribution portion of the diffuser including a plurality of gas feed holes in a longitudinal direction of the vehicle, the gas feed holes distributing gas in at least two different directions.

2. The air bag system according to claim 1, wherein the gas distribution portion of the diffuser is disposed substantially in a center of a width of the preliminary inflatable portion.

3. The air bag system according to claim 1, wherein the preliminary inflatable portion is stored in an unfolded state in the vehicle.

4. The air bag system according to claim 3, wherein the gas distribution portion of the diffuser is disposed substantially in a center of a width of the preliminary inflatable portion.

5. The air bag system according to claim 1, wherein the preliminary inflatable portion is adapted to be inflated into a substantially cylindrical shape.

6. The air bag system according to claim 1, wherein a width of the preliminary inflatable portion is substantially equal to a width of a gas passage serving to guide gas from the preliminary inflatable portion to an inflatable portion of the air bag.

7. The air bag system according to claim 1, wherein the gas distribution portion of the diffuser is disposed substantially in a center of a width of the preliminary inflatable portion.

8. The air bag system according to claim 1, wherein the plurality of gas feed holes have a same shape.

9. The air bag system according to claim 1, wherein at least one of the plurality of gas feed holes has a different shape.

10. The air bag system according to clam 1, wherein the diffuser is formed substantially in the form of the letter "L" including a connecting portion that has a substantially straight shape and is connected to the inflator and a gas distribution portion that extends in a curved shape from the connecting portion and is arranged within the gas supply port of the air bag.

11. The air bag system according to claim 10, wherein the gas supply port of the air bag includes an attaching portion to be airtightly attached onto a periphery of the connecting portion of the diffuser.

\* \* \* \* \*